April 10, 1928. Re. 16,927
J. H. ROSENCRANS
SECURING DEVICE FOR VEHICLES
Original Filed Feb. 27, 1922
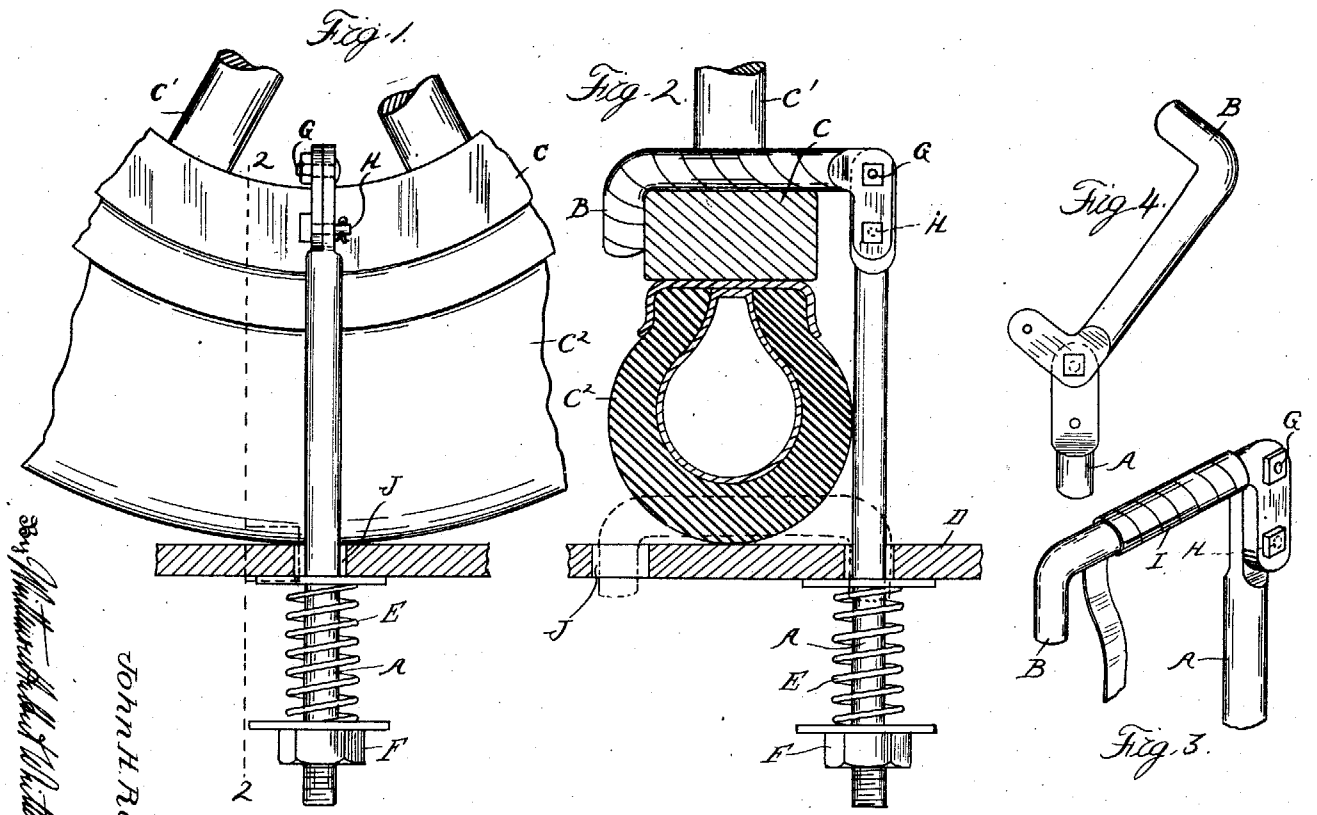
Inventor
John H. Rosencrans
By Whittemore, Hulbert & Whittemore & Belknap.
Attorneys Reissued Apr. 10, 1928. Re. 16,927

UNITED STATES PATENT OFFICE.

JOHN H. ROSENCRANS, OF DETROIT, MICHIGAN, ASSIGNOR OF ONE-HALF TO JAMES W. SMITH, OF DETROIT, MICHIGAN.

SECURING DEVICE FOR VEHICLES.

Original No. 1,495,442, dated May 27, 1924, Serial No. 539,344, filed February 27, 1922. Application for reissue filed January 26, 1925. Serial No. 4,974.

This invention relates generally to devices for securing merchandise to suitable supports and refers more particularly to devices for holding vehicles during shipment in freight cars and the like.

One of the essential objects of the invention is to provide an anchorage member for holding merchandise and more particularly a vehicle, upon a suitable support such as the floor of a carrier, the normal position of said anchorage member being maintained by a spring which may yield to some extent responsive to shocks, jars and vibrations experienced by the carrier in transit, thus avoiding undue strains either upon the anchorage member or the engaged part of the vehicle.

A further object of the invention is to provide a holding down device for vehicles (or other merchandise) in transit, which device when not in use will, of its own weight, assume a stored position substantially beneath the floor of the carrier so as to leave the floor of the latter substantially clear.

In the drawings;

Figure 1 is a view in side elevation showing the improved anchorage member engaged with a vehicle wheel, the floor to which said member is secured being sectionally illustrated;

Figure 2 is a sectional view of the same taken upon line 2—2 of Figure 1, and indicating in dash lines the stored position of the anchorage member;

Figure 3 is a fragmentary perspective view showing the padding means which is engaged with the anchorage member to prevent damage to the finish of the engaged vehicle wheel.

Figure 4 is a view of the hook portion of the anchorage member swung to a raised position to allow clearance room for the vehicle wheel to be engaged.

In these views, the reference character A designates a vertical stem terminating at its upper end in a hook B engaged with the felly C of a vehicle wheel. The spokes and tire of said wheel are indicated respectively at C′ and C². Said stem as shown passes through the floor D of the car, truck or other carrier in which the vehicle is being shipped, and is engaged below said floor by a coiled spring E urging said stem downwardly through engagement with a nut F adjustable upon the lower end of said stem. Preferably the hook B is pivoted, as indicated at G upon the stem A, and is held in rigid relation with said stem in use by the pin H. When the described device is not in use it occupies the position shown in dash lines in Figure 2, being almost entirely out of the way below the floor D, the latter having an aperture J to receive the point of the hook B.

The spring E accomplishes the double function of allowing a vertical adjustment of the stem A to adapt the same for engagement with different sized wheels, and said spring further allows a limited vertical play to the engaged wheel so as to permit the vehicle to respond to some extent to shocks, jars, and vibration, absorbing such stresses to some extent and preventing breakage or damage to either the vehicle or anchorage member, such as might result from unyielding resistance to such stresses. By pivoting the hook B upon the stem A it is not necessary to shift the vehicle laterally to engage said hook with the wheel. Instead the vehicle may be shifted to the position shown in the drawing in which each wheel is close adjacent the stem A of the corresponding anchorage member, and the hooks B may be thrown down on their pivots G to engage the fellies of the wheels, and the pins H may then be inserted to maintain the hooks rigid with their stems.

In Figure 3 there is disclosed a padding member I engaged with the hook B to protect the felly of the wheel from abrasion by said hook, said padding member as shown having the nature of a strip of fabric spirally wound upon the hook member to the desired thickness.

It is to be understood that the described anchorage member need not necessarily be secured to the floor of a carrier as the construction will be equally operative if said member is engaged with a wall, roof or any rigid element arranged within or upon, or forming a part of the carrier. The device may also be used upon other supports such as shelves, tops of desks and other pieces of furniture for holding miscellaneous articles of merchandise such as typewriters, adding machines, etc.

The described device is one that may be very easily applied to hold a vehicle or other merchandise in a substantially fixed position upon a support, and said device may be released from the merchandise with equal facility. It is to be observed that no tools are required either to engage the device with or disengage the same from the merchandise, and no manipulation of screws or bolts is required, and no nails are used. Thus the time and labor involved in attaching or detaching the device from the engaged merchandise or vehicle is minimized. No manipulation is necessary after detachment of the device from an engaged merchandise to shift the device to its stored position, said device dropping of its own weight to said position when released. In the stored position only a small portion of the anchorage member is exposed above the support and thus the device offers no appreciable obstacle to the use of the carrier for purposes not requiring the anchorage member.

What I claim as my invention is:

1. The combination with an article of merchandise, of a support therefor having spaced openings therethrough, a stem extending through one of said openings, a hook carried by said stem, and yieldable means engaging said stem below said support and normally retaining said hook in engagement with said article of merchandise said yieldable means being adapted to cause said hook to engage the other opening in said support when said hook is removed from said support.

2. The combination with an article of merchandise, of a support therefor having adjacent apertures, of means for holding the merchandise on the support including a stem extending through one of the apertures, an abutment on the stem, a hook carried by the stem having a depending portion engageable with the other of said apertures when not in use, and yieldable means between the abutment and support for holding the hook in engagement with the article of merchandise.

3. The combination with a substantial horizontal platform and a vehicle supported thereon, of means for holding the vehicle upon the platform including a stem extending through said platform, an adjustable hook carried by said stem, means movable transversely of the stem for detachably holding said hook in an adjusted position relative to said stem, and yieldable means engaging said stem below said platform for normally retaining said hook in engagement with said vehicle.

4. The combination with a substantial horizontal platform and a vehicle supported thereon, of means for holding the vehicle upon the platform including a stem extending through said platform, a hook engageable with the vehicle pivoted to said stem, means for detachably holding said hook in an adjusted position, and yieldable means surrounding said stem below said platform for normally retaining said hook in engagement with said vehicle.

5. The combination with a substantial horizontal platform and a vehicle supported thereon, of means for holding the vehicle upon the platform including a stem extending through said platform, a hook adjustably mounted upon said stem, yieldable means surrounding said stem below said support for normally retaining said hook in engagement with said vehicle, and a removable member for retaining said hook in a predetermined position with respect to said stem.

In testimony whereof I affix my signature.

JOHN H. ROSENCRANS.